US00RE38496E

(19) United States
(12) Reissued Patent
Sawamura et al.

(10) Patent Number: US RE38,496 E
(45) Date of Reissued Patent: Apr. 13, 2004

(54) THERMOSENSITIVE RECORDING MATERIAL

(75) Inventors: Ichiro Sawamura, Numazu (JP); Motoo Tasaka, Susono (JP)

(73) Assignee: Ricoh Company, Ltd., Tokyo (JP)

(21) Appl. No.: 09/652,306

(22) Filed: Aug. 30, 2000

Related U.S. Patent Documents

Reissue of:
(64) Patent No.: 5,866,508
Issued: Feb. 2, 1999
Appl. No.: 08/773,532
Filed: Dec. 23, 1996

(30) Foreign Application Priority Data

Dec. 21, 1995 (JP) ..... 7-349036
Dec. 27, 1995 (JP) ..... 7-351330

(51) Int. Cl.[7] ..... B41M 5/40

(52) U.S. Cl. ..... 503/226; 427/152; 503/200

(58) Field of Search ..... 427/152; 503/200, 503/226

(56) References Cited

U.S. PATENT DOCUMENTS

| | | | | | |
|---|---|---|---|---|---|
| 5,026,606 | A | | 6/1991 | Isbrandt et al. | 428/421 |
| 5,087,527 | A | * | 2/1992 | Shimura et al. | 428/488.4 |
| 5,238,900 | A | * | 8/1993 | Shuku | 503/207 |
| 5,403,810 | A | * | 4/1995 | Sawamura et al. | 503/201 |
| 5,409,881 | A | * | 4/1995 | Mori et al. | 503/207 |
| 5,521,138 | A | * | 5/1996 | Shimada et al. | 503/209 |
| 5,536,697 | A | * | 7/1996 | Hada et al. | 503/207 |

FOREIGN PATENT DOCUMENTS

| | | |
|---|---|---|
| EP | 0 339 670 | 11/1989 |
| GB | 2 267 158 | 11/1993 |

* cited by examiner

*Primary Examiner*—B. Hamilton Hess
(74) *Attorney, Agent, or Firm*—Oblon, Spivak, McClelland, Maier & Neustadt, P.C.

(57) ABSTRACT

A thermosensitive recording material has a support, a thermosensitive recording layer formed thereon, containing an electron-donating coloring compound, an electron-accepting compound a binder resin, and a protective layer formed on the thermosensitive recording layer, which contains an ultraviolet-curing resin and a copolymer resin containing a silicone component as a copolymerizing component.

17 Claims, No Drawings

THERMOSENSITIVE RECORDING MATERIAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a thermosensitive recording material with light transmission properties, capable of forming colored images therein by a coloring reaction between an electron-donating coloring compound and an electron-accepting compound, more particularly to a thermosensitive recording material which can be used as a film of a block copy, that is, an image formation film for gravure printing, offset printing, and screen process printing; a block copy film for screen textile printing; an image formation film for use with an overhead projector (OHP): and an image formation film for use in the system of computer aided design (CAD).

2. Discussion of Background

There is widely known a thermosensitive recording material capable of producing a colored image therein by the coloring reaction between an electron donating compound (hereinafter referred to as a coloring agent) and an electron accepting compound (hereinafter referred to as a color developer).

Generally, such a thermosensitive recording material is prepared by providing on a support such as a paper, a synthetic paper or a plastic film, a thermosensitive recording layer which comprises as the main component a thermosensitive coloring composition. A colored image can be formed in the thermosensitive recording material by the application of heat thereto using a thermal head, thermal pen or laser beam. This type of recording material is advantageous over other conventional recording materials because the recording can be speedily achieved by a simple process without complicated development and image fixing steps, using a relatively compact device. Noise development and environmental problems can be minimized, and the manufacturing cost of the recording material is low. Owing to the above-mentioned advantages of the thermosensitive recording material, it is utilized in a wide number of fields such as electronic computer terminals, facsimile machines, and recorders and automatic vending machines for labels and tickets.

The above-mentioned thermosensitive coloring composition for use in the thermosensitive recording material comprises a coloring agent, and a color developer capable of inducing color formation in the coloring agent upon application of heat thereto. To be more specific, colorless to light-colored leuco dyes with a lactone or lactam, or a spiropyran ring are employed as the coloring agents; and a variety of acidic materials such as an organic acid and a phenolic compound are conventionally used as the color developers. The recording material employing the combination of the above-mentioned coloring agent and color developer is capable of producing colored images with clear tone, with maintaining a high degree of whiteness of the background. In addition, the weather resistance of the obtained colored images is superior.

In recent years, the thermosensitive recording system has replaced the conventional recording systems. Further, in line with the increase of demand for the thermosensitive recording system, there is an increasing demand for the improvement of quality of a thermosensitive recording material for use with the above-mentioned thermosensitive recording system. For example, there is a demand for a transparent or translucent thermosensitive recording material capable of producing an image with high image contrast, which can be used as an image formation film for the OHP, a diazo intermediate paper, a film for design drawing, and a block copy film for gravure printing, offset printing, and screen process printing.

A transparent thermosensitive recording medium is proposed in Japanese Laid-Open Patent Application 1-99879. To prepare such a transparent thermosensitive recording medium, a coating liquid of an emulsion dispersion comprising a coloring agent in microcapsule form and a color developer which is dissolved in an organic solvent that is insoluble or slightly soluble in water is coated on a transparent support.

Another method for preparing a transparent thermosensitive recording medium is disclosed in Japanese Laid-Open Patent Application 5-104859. According to this application, the first thing is to chose a solvent in which an organic acid to be employed as the color developer is slightly soluble or insoluble, and a coloring agent and a binder resin to be employed are soluble. A dispersion prepared by finely dispersing the organic acid serving as the color developer in the above-mentioned solvent, and a solution prepared by dissolving the coloring agent and the binder resin in the above-mentioned solvent are mixed and stirred, so that a coating liquid for a thermosensitive recording layer is obtained. The coating liquid thus obtained is coated on a transparent support, thereby obtaining a thermosensitive recording layer. Then, a protective layer mainly comprising a resin is provided on the thermosensitive recording layer in order to fill up the minute surface roughness of the thermosensitive recording layer. By this method, a thermosensitive recording medium with high transparency can be obtained.

In addition, a thermosensitive recording medium which is applicable to a block copy film for printing is proposed as disclosed in Japanese Laid-Open Patent Application 8-118811.

However, the matching properties of those conventional transparent or translucent thermosensitive recording media to the thermal head are almost ignored because too much stress is laid on the transparency of the recording media. For instance, a thermofusible material for use in the thermosensitive recording medium is fused during the thermal printing operation, and such fused dust is attached to the thermal head. As a result, the image thus obtained becomes blurred, and the thermal head is worn away and short-circuit occurs between the electrodes of the thermal head. In addition, there occurs the so-called sticking phenomenon that the thermosensitive recording medium sticks to the thermal head by the application of heat load thereto, and consequently, abnormal images are produced. As mentioned above, the head-matching problems of the conventional transparent or translucent thermosensitive recording medium are more serious than those of the general-purpose thermosensitive recording paper, so that the improvements are highly desired. Particularly, when the thermosensitive recording medium is used as a block copy film for printing, the improvement of the head-matching properties of the thermosensitive recording medium is one of the most important topics because dimensional accuracy of images independently formed on block copy films with different colors is required when these block copy films with different colors are incorporated.

From the functional viewpoint, it is desirable that the problem of the head-matching properties be compensated by the protective layer provided on the thermosensitive recording layer. A material with high heat resistance, excellent thermal releasability, and sufficient binding properties is preferably employed for the protective layer for the purpose of improving the head-matching properties. Furthermore, the protective layer works to improve the transparency of the recording medium, and impart the chemical resistance, water resistance, light resistance and wear resistance to the recording medium. Selection of the materials for the protective layer is therefore very important when the above-mentioned functions of the protective layer are taken into consideration.

Furthermore, there remains the problem of fogging, that is, one of the problems concerning any thermosensitive recording materials, and the improvement of the fogging is eagerly desired.

SUMMARY OF THE INVENTION

It is therefore a first object of the present invention to provide a thermosensitive recording material from which the problem of the conventional transparent or translucent thermosensitive recording materials, that is, insufficient matching performance to the thermal head has been eliminated. In other words, the first object of the present invention is to provide a thermosensitive recording material which can minimize the generation of dust of the thermofusible material adhering to the thermal head, and prevent the sticking phenomenon from happening.

A second object of the present invention is to provide a thermosensitive recording material with minimum fogging.

The above-mentioned first and second objects of the present invention can be achieved by a thermosensitive recording material comprising a support, a thermosensitive recording layer formed thereon, comprising an electron-donating coloring compound, an electron-accepting compound and a binder resin, and a protective layer formed on the thermosensitive recording layer, comprising an ultraviolet-curing resin and a copolymer resin comprising a silicone component as a copolymerizing component therefor.

DESCRIPTION OF THE PREFERRED EMBODIMENTS

A resin component for use in the protective layer of the thermosensitive recording material according to the present invention is required to have high heat resistance. In such a sense, a cured resin capable of establishing a three-dimensional network structure is theoretically preferable for the protective layer. However, it is impossible to cure the resin at a temperature of 60° C. or more in the production of the thermosensitive recording material. Further, when the productivity of the recording material is taken into consideration, a protective layer comprising an ultraviolet-curing resin and a copolymer resin comprising a silicone component as a copolymerizing component therefore in considered to be effective.

For the ultraviolet-curing resin, there can be employed any conventional monomer, oligomer, or prepolymer that is polymerizable to form a cured resin by the application thereto of ultraviolet light. There are no limitations on such a monomer, oligomer or prepolymer for the preparation of the ultraviolet-curing resin for use in the protective layer.

Specific examples of such a monomer or oligomer include (poly)ester acrylate, (poly)urethane acrylate, epoxy acrylate, polybutadiene acrylate, silicone acrylate, and melamine acrylate.

The above-mentioned (poly)ester acrylate is prepared by allowing a polyhydric alcohol such as 1,6-hexanediol, propylene glycol (in the form of propylene oxide) or diethylene glycol, and a polybasic acid such as adipic acid, phthalic anhydride or trimellitic acid to react with acrylic acid.

Examples of the structure of the (poly)ester acrylate are as follows:

(a) Adipic acid/1,6-hexanediol/acrylic acid

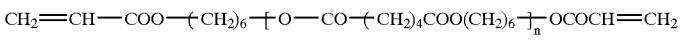

wherein n is an integer of 1 to 10.

(b) Phthalic anhydride/propylene oxide/acrylic acid

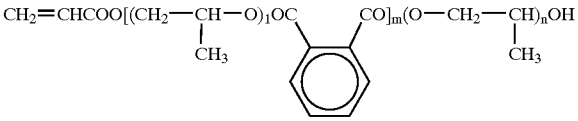

wherein l, m and n are each independently an integer of 1 to 10.

(c) Trimellitic acid/diethylene glycol/acrylic acid

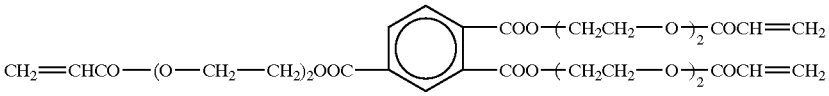

The (poly)urethane acrylate is prepared by allowing a compound having an isocyanate group, such as tolylene diisocyanate (TDI) to react with an acrylate having hydroxyl group.

The structure of the (poly)urethane acrylate is as follows:

(d) HEA/TDI/HDO/ADA/HDO/TDI/HEA, wherein HEA is 2-hydroxyethyl acrylate, TDI is tolylene diisocyanate, HDO is 1,6-hexanediol, and ADA is adipic acid.

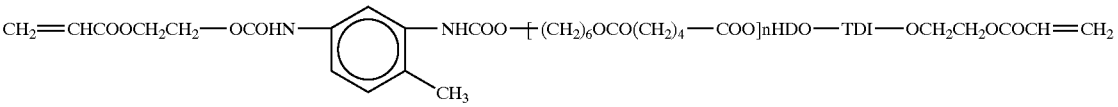

wherein n is an integer of 1 to 10.

Epoxy acrylate can be roughly classified into a bisphenol A type, a novolak type, and an alicyclic type. The epoxy group of these epoxy resins is esterified with acrylic acid to convert it to an acryloyl group.

Examples of the structure of epoxy acrylate are as follows:

(e) Bisphenol A–epichlorohydrin type/acrylic acid

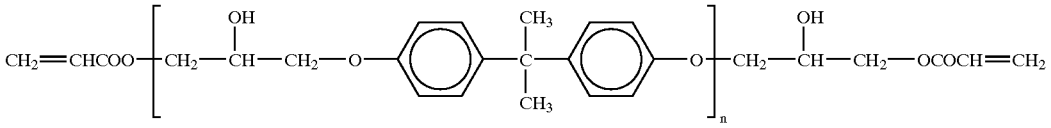

wherein n is an integer of 1 to 15.

(f) Phenolic novolakc–epichlorohydrin type/acrylic acid

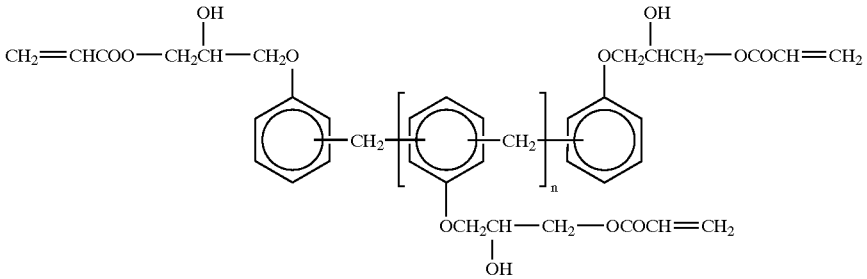

wherein n is an integer of 0 to 5.

(g) Alicyclic type/acrylic acid

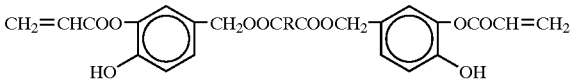

wherein R represents $—(CH_2)_n—$, in which n is an integer of 1 to 10.

Polybutadiene acrylate is prepared by allowing isocyanate or 1,2-mercaptoethanol to react with a terminal-hydroxyl-group-containing 1,2-butadiene to obtain a reaction product, and then by allowing the thus obtained reaction product to react with acrylic acid or the like.

An example of the structure of the polybutadiene acrylate is as follows:

(h)

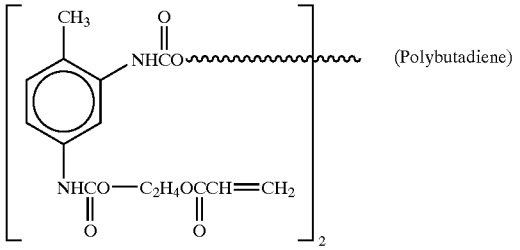

Silicone acrylate is obtained by methacryl modification which is conducted, for example, by a condensation reaction (methanol elimination reaction) between an organic functional trimethoxy silane and a silanol-group containing polysiloxane.

An example of the structure of the silicone acrylate is as follows:

(i)

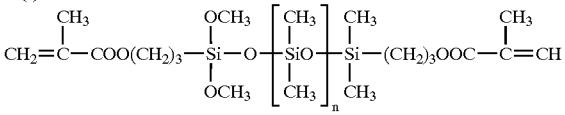

wherein n is an integer of 10 to 14.

When the ultraviolet-curing resin is employed for the protective layer, a solvent may be used.

Examples of the above-mentioned solvent are organic solvents such as tetrahydrofuran, methyl ethyl ketone, methyl isobutyl ketone, chloroform, carbon tetrachloride, ethanol, isopropyl alcohol, ethyl acetate, butyl acetate, toluene and benzene.

Instead of these organic solvents, a photopolymerizable monomer may be employed as a reactive diluent to make the handling easy.

Specific examples of the aforementioned photopolymerizable monomer include 2-ethylhexyl acrylate, cyclohexyl acrylate, butoxyethyl acrylate, neopentyl glycol diacrylate, 1,6-hexanediol diacrylate, polyethylene glycol diacrylate, trimethylolpropane triacrylate, and pentaerythritol triacrylate.

In the present invention, it is preferable that the amount of ultraviolet-curing resin for use in the protective layer be in the range of 10 to 50 wt. % of the total weight of the entire solid components of the protective layer. When the amount of ultraviolet-curing resin for use in the protective layer is within the above-mentioned range, the heat resistance of the protective layer can be maintained, so that the dust of thermofusible material can be prevented from adhering to the surface of the thermal head. At the same time, the thermosensitive recording material can be provided with sufficient lubricity, so that occurrence of the sticking phenomenon can be minimized.

The protective layer of the thermosensitive recording material according to the present invention comprises as the resin component the above-mentioned ultraviolet-curing resin, and a copolymer resin comprising a silicon component.

Any copolymer resin comprising a silicone segment is usable, but a silicone-graft-copolymer or silicone-block-copolymer is advantageous because of its excellent heat resistance.

Specific examples of the copolymer resin comprising the silicone segment include silicone-modified, polyvinyl butyral, silicone-modified polyvinyl acetal, silicone-modified polyacrylate, silicone-modified polymethacrylate, silicone-modified polyvinyl acetoacetal, silicone-modified cellulose acetate propionate, silicone-modified cellulose acetate, silicone-modified cellulose acetate butyrate, silicone-modified ethyl cellulose, silicone-modified polyurethane, and silicone-modified polyester.

Of these silicone-modified resins, silicone-modified polyvinyl butyral and silicone-modified polyvinyl acetal are remarkably effective in terms of heat resistance.

It is preferable that the amount ratio by weight of the copolymer resin comprising the silicone segment to the ultraviolet-curing resin for use in the protective layer be in the range of (1:9) to (7:3). When the above-mentioned amount ratio between those two resins is satisfied, the occurrence of sticking phenomenon can be prevented because of sufficient lubricity of the obtained thermosensitive recording material. At the same time, the heat resistance of the protective layer is sufficiently high, so that the dust of thermofusible material can be prevented from adhering to the thermal head.

As previously mentioned, when the protective layer comprising the ultraviolet-curing resin and the copolymer resin comprising a silicone segment is provided on the thermosensitive recording layer, the matching properties of the thermosensitive recording material to the thermal head are improved, thereby preventing the dust of thermofusible material from adhering to the thermal head, and minimizing the occurrence of sticking phenomenon.

As a result of further intensive studies, it has become apparent that when the protective layer further comprises a cross-linking agent which can react with the above-mentioned copolymer resin comprising a silicone segment, the heat resistance of the protective layer can be further improved and the occurrence of the sticking phenomenon can be minimized even though the thermal printing is carried out under the application of high thermal energy to the thermosensitive recording material.

In this case, any cross-linking agent that can react with the copolymer resin comprising a silicone segment to form a three-dimensional structure can be employed. For example, there can be employed an isocyanate compound, and a compound having epoxy group or amino group as the cross-linking agents.

In particular, the isocyanate compound is most preferably employed as the cross-linking agent because the reactivity with the copolymer resin comprising a silicone segment is excellent and the stability after reaction is superior.

Specific examples of the isocyanate compound serving as the cross-linking agent are xylylene diisocyanate, tolylene diisocyanate, 4,4-diphenylmethane diisocyanate, 1,5-naphthalene diisocyanate, triphenylmethane triisocyanate, tolidine diisocyanate, xylene diisocyanate, hexamethylene diisocyanate and modified compounds thereof, dicyclohexylmethane diisocyanate, and isophorone diisocyanate.

Of the above-mentioned isocyanate compounds, xylylene diisocyanate is particularly effective for prevention of the fogging of the thermosensitive recording layer.

It is preferable that the amount of the isocyanate compound for use in the protective layer be in the range of 3 to 30 wt. % of the total weight of solid content of the protective layer. When the isocyanate compound in such an amount is contained in the protective layer, sufficient cross-linking reaction takes place, so that the generation of thermofusible material dust sticking to the thermal head can be minimized. In addition, since unreacted isocyanate does not practically remain, the increase of heat resistance of the protective layer is not hindered, thereby preventing the occurrence of sticking phenomenon.

Furthermore, to cope with the thermal printing operation with the application of high thermal energy to the thermosensitive recording material, it is preferable that the protective layer further comprise a metallic soap and/or an amino-modified silicone oil. In this case, the head-matching properties of the thermosensitive recording material are remarkably improved.

As the metallic soap for use in the present invention, there can be used a fatty acid metallic salt having 10 or more carbon atoms, for example, barium stearate, calcium stearate, zinc stearate, aluminum stearate, and magnesium stearate.

It is preferable that the amount of the metallic salt for use in the protective layer be in the range of 0.5 to 10 wt. % of the total weight of solid content of the protective layer.

The above-mentioned amino-modified silicone oil for use in the protective layer is a silicone oil having aminopropyl group or N-(2-aminoethyl)aminopropyl group in its molecule. Unlike dimethyl silicone oil, the aforementioned amino-modified silicone oil is chemically active because it has reactive amino group.

It is preferable that the amount of the amino-modified silicone oil for use in the protective layer be in the range of 0.5 to 10 wt. % of the total weight of solid content of the protective layer.

In order to effectively eliminate the fogging of the thermosensitive recording layer, the thermosensitive recording layer or the protective layer may further comprise at least one decolorization agent selected from the group consisting of the following compounds A to D:

[Compound A]

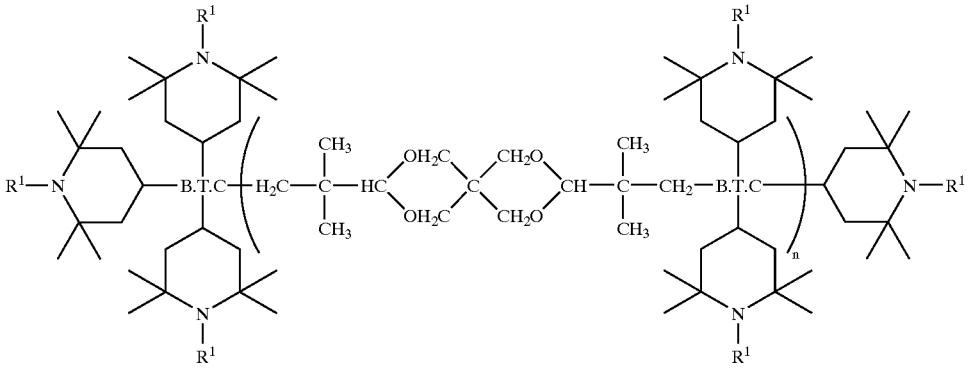

wherein n is an integer; $R^1$ is $CH_3$;

[Compound B]

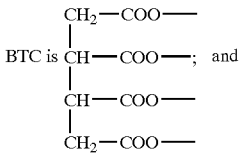

BTC is $CH_2$—COO—; and
CH—COO—
CH—COO—
$CH_2$—COO—

-continued

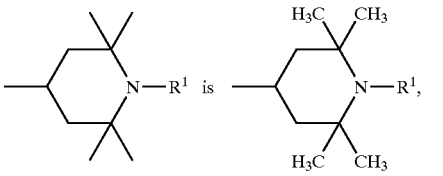

[Compound C]

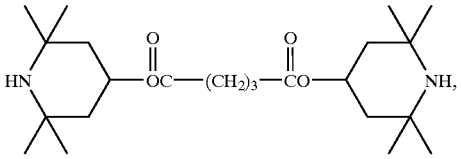

[Compound D]

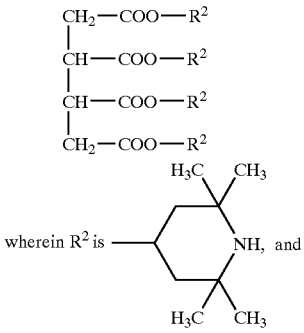

1,3-dicyclohexyl-2-(2′,5′-dicyclophenyl)guanidine.

To make the heat resistance and the sticking prevention property of the protective layer even better, the protective layer may further comprise a filler which has high heat resistance and is capable of removing the thermofusible dust adhering to the thermal head therefrom.

The filler is roughly classified into two groups, that is, an organic filler and an inorganic filler. In the present invention, the organic and inorganic fillers can be used in combination for the protective layer to such a degree that the surface smoothness of the protective layer is not extremely decreased and the transparency of the thermosensitive recording material is not impaired.

Specific examples of the filler for use in the present invention are finely-divided particles of an inorganic filler such as calcium carbonate, silica, zinc oxide, titanium oxide, aluminum hydroxide, zinc hydroxide, barium sulfate, kaolin, talc, and surface-treated calcium carbonate and silica; and finely-divided particles of an organic filler such as urea formalin resin, styrene-methacrylic acid copolymer and polystyrene resin. Those organic and inorganic fillers can be used alone or in combination.

It is preferable that the filler for use in the present invention be in the form of finely-divided particles with an average particle size of 3 μm or less, and have an oil absorption of 10 ml or more.

In the protective layer, it is preferable that the amount ratio by weight of the filler to the resin component comprising the ultraviolet-curing resin and the copolymer resin comprising a silicone segment to the cross-linking agent be (10 to 60%):(5 to 75%):(3 to 30%).

The protective layer of the thermosensitive recording material is required to have not only excellent head-matching properties, but also high transparency, preservation stability and the like. Therefore, other materials may be contained in the protective layer.

For instance, the above-mentioned ultraviolet-curing resin and the copolymer resin comprising a silicone segment may be used in combination with the following hydrophobic resins: ethyl cellulose, cellulose propionate acetate, cellulose butyrate acetate, polyvinyl butyral, polyvinyl acetal, polyester, cellulose acetate, polyurethane, polyacrylate, vinyl chloride–vinyl acetate copolymer, polyacrylic acid, polyvinyl acetate, polystyrene, and ethylene–vinyl acetate copolymer.

Further, similar to the thermosensitive recording layer, the protective layer may further comprise a lubricant, ultraviolet light absorber, antioxidant, fog inhibitor, and dispersant in addition to the above-mentioned metallic soap and amino-modified silicone oil.

It is preferable that the thickness of the protective layer be in the range of 0.3 to 10 μm, more preferably 0.5 to 5 μm. When the thickness of the protective layer is within the above-mentioned range, the increase of manufacturing cost can be prevented, and the protective layer can sufficiently function to improve the preservation stability of the recording material, and upgrade the head-matching properties, without decreasing the thermal sensitivity of the recording material.

The thermosensitive recording layer will now be described in detail.

In the thermosensitive recording material of the present invention, it is preferable that the refractive index of the protective layer and that of the thermosensitive recording layer be substantially the same. Theoretically, even if the refractive indexes of those layers are different, the light entering the thermosensitive recording layer is just refracted without scattering when the refractive index and the thickness of each layer is uniform, and the interface between the protective layer and the thermosensitive recording layer is flat. When such a thermosensitive recording material is used as a block copy film for screen process printing, a colored image formed in the thermosensitive recording material can be printed on a screen with high resolution using transmitted light. In practice, however, the resolution is considerably decreased when the interface between the protective layer and the thermosensitive recording layer is not a plane surface. In addition, when there is a difference between the refractive index of the thermosensitive recording layer and that of the protective layer, the reflectance is increased at the interface between the two layers, thereby decreasing the transparency of the recording material. With these points being taken into consideration, it is preferable that the refractive index of the thermosensitive recording layer and that of the protective layer be substantially the same.

The thermosensitive recording layer comprises an electron-donating compound as a coloring agent. The coloring agent for use in the present invention is a colorless or light-colored dye precursor and is not limited to particular compounds, but conventional coloring agents such as triphenylmethane phthalide leuco compounds, triallylmethane leuco compounds, fluoran leuco compounds, phenolthiazine leuco compounds, thiofluoran leuco compounds, xanthene leuco compounds, indophthalyl leuco compounds, spiropyran leuco compounds, azaphtalide leuco compounds, couromeno-pyrazole leuco compounds, methine leuco compounds, rhodamineanilinolactam leuco compounds, rhodaminelactam leuco compounds, quinazoline leuco compounds, diazaxanthene leuco compounds, and bislactone leuco compounds are preferably employed.

Specific examples of those leuco dyes are as follows:

2-anilino-3-methyl-6-diethylaminofluoran, 2-anilino-3-methyl-6-(di-n-butylamino)fluoran, 2-anilino-3-methyl-6-(N-n-propyl-N-methylamino)fluoran,
2-anilino-3-methyl-6-(N-isopropyl-N-methylamino)fluoran,
2-anilino-3-methyl-6-(N-isobutyl-N-methylamino)fluoran,
2-anilino-3-methyl-6-(N-n-amyl-N-methylamino)fluoran,
2-anilino-3-methyl-6-(N-sec-butyl-N-ethylamino)fluoran,
2-anilino-3-methyl-6-(N-n-amyl-N-ethylamino)fluoran,
2-anilino-3-methyl-6-(N-isoamyl-N-ethylamino)fluoran,
2-anilino-3-methyl-6-(N-n-propyl-N-isopropylamino) fluoran,
2-anilino-3-methyl-6-(N-cyclohexyl-N-methylamino) fluoran,
2-anilino-3-methyl-6-(N-ethyl-p-toluidino)fluoran,
2-anilino-3-methyl-6-(N-methyl-p-toluidino)fluoran,
2-(m-trichloromethylanilino)-3-methyl-6-diethylaminofluoran,
2-(m-trifluoromethylanilino)-3-methyl-6-diethylaminofluoran,
2-(m-trifluoromethylanilino)-3-methyl-6-(N-cyclohexyl-N-methylamino)fluoran,
2-(2,4-dimethylanilino)-3-methyl-6-diethylaminofluoran,
2-(N-ethyl-p-toluidino)-3-methyl-6-(N-ethylanilino) fluoran,
2-(N-methyl-p-toluidino)-3-methyl-6-(N-propyl-p-toluidino)fluoran,
2-anilino-6-(N-n-hexyl-N-ethylamino)fluoran,
2-(o-chloroanilino)-6-diethylaminofluoran,
2-(o-bromoanilino)-6-diethylaminofluoran,
2-(o-chloroanilino)-6-dibutylaminofluoran,
2-(m-trifluoromethylanilino)-6-diethylaminofluoran,
2-(p-acetylanilino)-6-(N-n-amyl-N-n-butylamino)fluoran,
2-benzylamino-6-(N-ethyl-p-toluidino)fluoran,
2-benzylamino-6-(N-methyl-2,4-dimethylanilino)fluoran,
2-benzylamino-6-(N-ethyl-2,4-dimethylanilino)fluoran,
2-dibenzylamino-6-(N-methyl-p-toluidino)fluoran,
2-dibenzylamino-6-(N-ethyl-p-toluidino)fluoran,
2-(di-p-methylbenzylamino)-6-(N-ethyl-p-toluidino) fluoran,
2-(α-phenylethylamino)-6-(N-ethyl-p-toluidino)fluoran,
2-methylamino-6-(N-methylanilino)fluoran,
2-methylamino-6-(N-ethylanilino)fluoran,
2-methylamino-6-(N-propylanilino)fluoran,
2-ethylamino-6-(N-methyl-p-toluidino)fluoran,
2-methylamino-6-(N-methyl-2,4-dimethylanilino)fluoran,
2-ethylamino-6-(N-methyl-2,4-dimethylanilino)fluoran,
2-dimethylamino-6-(N-methylanilino)fluoran,
2-dimethylamino-6-(N-ethylanilino)fluoran,
2-diethylamino-6-(N-methyl-p-toluidino)fluoran,
2-diethylamino-6-(N-ethyl-p-toluidino)fluoran,
2-dipropylamino-6-(N-methylanilino)fluoran,
2-dipropylamino-6-(N-ethylanilino)fluoran,
2-amino-6-(N-methylanilino)fluoran,
2-amino-6-(N-ethylanilino)fluoran,
2-amino-6-(N-propylanilino)fluoran,
2-amino-6-(N-methyl-p-toluidino)fluoran,
2-amino-6-(N-ethyl-p-toluidino)fluoran,
2-amino-6-(N-propyl-p-toluidino)fluoran,
2-amino-6-(N-methyl-p-ethylanilino)fluoran,
2-amino-6-(N-ethyl-p-ethylanilino)fluoran,
2-amino-6-(N-propyl-p-ethylanilino)fluoran,
2-amino-6-(N-methyl-2,4-dimethylanilino)fluoran,
2-amino-6-(N-ethyl-2,4-dimethylanilino)fluoran,
2-amino-6-(N-propyl-2,4-dimethylanilino)fluoran,
2-amino-6-(N-methyl-p-chloroanilino)fluoran,
2-amino-6-(N-ethyl-p-chloroanilino)fluoran,
2-amino-6-(N-propyl-p-chloroanilino)fluoran,
2-amino-6-(N-propyl-p-chloroanilino)fluoran,
2,3-dimethyl-6-dimethylaminofluoran,
3-methyl-6-(N-ethyl-p-toluidino)fluoran,
2-chloro-6-diethylaminofluoran,
2-bromo-6-diethylaminofluoran,
2-chloro-6-dipropylaminofluoran,
3-chloro-6-cyclohexylaminofluoran,
3-bromo-6-cyclohexylaminofluoran,
2-chloro-6-(N-ethyl-N-isoamylamino)fluoran,
2-chloro-3-methyl-6-diethylaminofluoran,
2-anilino-3-chloro-6-diethylaminofluoran,
2-(o-chloroanilino)-3-chloro-6-cyclohexylaminofluoran,
2-(m-trifluoromethylanilino)-3-chloro-6-diethylaminofluoran,
2-(2,3-dichloroanilino)-3-chloro-6-diethylaminofluoran,
1,2-benzo-6-diethylaminofluoran,
1,2-benzo-6-(N-ethyl-N-isoamylamino)fluoran,
1,2-benzo-6-dibutylaminofluoran,
1,2-benzo-6-(N-ethyl-N-cyclohexylamino)fluoran, and
1,2-benzo-6-(N-ethyl-toluidino)fluoran.

The following coloring agents can also be preferably employed in the present invention:

2-anilino-3-methyl-6-(N-2-ethoxypropyl-N-ethylamino) fluoran,
2-(p-chloroanilino)-6-(N-n-octylamino)fluoran,
2-(p-chloroanilino)-6-(N-n-palmitylamino)fluoran,
2-(p-chloroanilino)-6-(di-n-octylamino)fluoran,
2-benzoylamino-6-(N-ethyl-p-toluidino)fluoran,
2-(o-methoxybenzoylamino)-6-(N-ethyl-p-toluidino) fluoran,
2-dibenzylamino-4-methyl-6-diethylaminofluoran,
2-dibenzylamino-4-methoxy-6-(N-methyl-p-toluidino) fluoran,
2-dibenzylamino-4-methyl-6-(N-othyl-p-toluidino)fluoran,
2-(α-phenylethylamino)-4-methyl-6-diethylaminofluoran,
2-(p-toluidino)-3-(t-butyl)-6-(N-methyl-p-toluidino)fluoran,
2-(o-methoxycarbonylanilino)-6-diethylaminofluoran,
2-acetylamino-6-(N-methyl-p-toluidino)fluoran,
3-diethylamino-6-(m-trifluoromethylanilino)fluoran,
4-methoxy-6-(N-ethyl-p-toluidino)fluoran,
2-ethoxyethylamino-3-chloro-6-dibutylaminofluoran,
2-dibenzylamino-4-chloro-6-(N-ethyl-p-toluidino)fluoran,
2-(α-phenylethylamino)-4-chloro-6-diethylaminofluoran,
2-(N-benzyl-p-trifluoromethylanilino)-4-chloro-6-diethylaminofluoran,
2-anilino-3-methyl-6-pyrrolidinofluoran,
2-anilino-3-chloro-6-pyrrolidinofluoran,
2-anilino-3-methyl-6-(N-ethyl-N-tetrahydrofurfurylamino) fluoran,
2-mesidino-4',5'-benzo-6-diethylaminofluoran,
2-(m-trifluoromethylanilino)-3-methyl-6-pyrrolidinofluoran,
2-(α-naphthylamino)-3,4-benzo-4'-bromo-6-(N-benzyl-N-cyclohexylamino)fluoran,
2-piperidino-6-diothylaminofluoran,
2-(N-n-propyl-p-trifluoromethylanilino)-6-morpholinofluoran,
2-(di-N-p-chlorophenyl-methylamino)-6-pyrrolidinofluoran,
2-(N-n-propyl-m-trifluoromethylanilino)-6-morpholinofluoran,
1,2-benzo-6-(N-ethyl-N-n-octylamino)fluoran,
1,2-benzo-6-diallylaminofluoran,
1,2-benzo-6-(N-ethoxyethyl-N-ethylamino)fluoran, benzo leuco methylene blue,
2-[3,6-bis(diethylamino)]-6-(o-chloroanilino) xanthylbenzoic acid lactam,
2-[3,6-bis(diethylamino)]-9-(o-chloroanilino) xanthylbunzoic acid lactam, 3,3-bis(p-dimethylaminophenyl)phthalide,
3,3-bis(p-dimethylaminophenyl)-6-dimethylaminophthalide (or Crystal Violet Lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide,
3-(2-methoxy-4-dimethylaminophenyl)-3-(2-hydroxy-4,5-dichlorophenyl)phthalide,
3-(2-hydroxy-4-dimethylaminophenyl)-3-(2-methoxy-5-chlorophenyl)phthalide,
3-(2-hydroxy-4-dimethoxyaminophenyl)-3-(2-methoxy-5-chlorophenyl)phthalide,
3-(2-hydroxy-4-dimethylaminophenyl)-3-(2-methoxy-5-nitrophenyl)phthalide,
3-(2-hydroxy-4-diethylaminophenyl)-3-(2-methoxy-5-methylphenyl)phthalide,
3,6-bis(dimethylamino)fluorenespiro(9,3')-6'-dimethylaminophthalide,
6'-chloro-8'-methoxy-benzoindolino-spiropyran, and
6'-bromo-2'-methoxy-benzoindolino-spiropyran.

Those coloring agents may be used alone or in combination.

The color developer for use in the thermosensitive recording layer is an electron-accepting compound capable of inducing color formation in the above-mentioned coloring agents. A variety of conventional electron-accepting color developers can be employed in the present invention. In particular, an electron-accepting color developer having a long-chain alkyl group in its molecule as stated in Japanese Patent Application 3-355078 is preferably used as the color developer in the present invention. For example, there are disclosed an organic phosphoric acid compound, an aliphatic carboxylic acid compound and a phenolic compound, each having an aliphatic group with 12 or more carbon atoms; a metallic salt of mercaptoacetic acid having an aliphatic group with 10 to 18 carbon atoms; an alkylester of caffeic acid having an alkyl group with 5 to 8 carbon atoms; and an acid phosphate having an aliphatic group with 16 or more carbon atoms. The above-mentioned aliphatic group includes a straight-chain or branched alkyl group or alkenyl group, which may have a substituent such as a halogen atom, an alkoxyl group, or an ester group.

Of the above-mentioned examples of the color developers, the organic phosphoric acid compound represented by the following formula (1) or (2) is particularly preferable:

[Formula (1)]

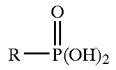

wherein R is a straight-chain alkyl group having 16 to 24 carbon atoms.

[Formula (2)]

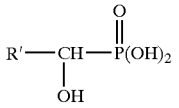

wherein R' is a straight-chain alkyl group having 13 to 23 carbon atoms.

Those color developers can be used alone or in combination.

With respect to the amount ratio of the color developer to the coloring agent, it is preferable that one to 20 parts by weight, more preferably 2 to 10 parts by weight, of the color developer be ised in combination with one part by weight of the coloring agent.

The thermosensitive recording layer comprises a binder resin. Examples of the binder resin for use in the thermosensitive recording layer are polyvinyl acetal resins such as polyvinyl butyral and polyvinyl acetoacetal; cellulose derivatives such as ethyl cellulose, cellulose acetate, cellulose acetate propionate and cellulose acetate butyrate; and epoxy resin. Those resins can be used alone or in combination.

To obtain the thermosensitive recording layer, a coating liquid for the thermosensitive recording layer is prepared by uniformly dispersing or dissolving a coloring agent, a color developer and a binder resin in an organic solvent. Then, the coating liquid thus prepared is coated on a support and dried. The coating method is not particularly limited. It is preferable that the particle size of the particles dispersed in the coating liquid be 10 $\mu$m or loss, more preferably 5 $\mu$m or less, further preferably 1 $\mu$m or less.

The thickness of the thus obtained thermosensitive recording layer, which varies depending on the formulation for the thermosensitive recording layer or the application of the obtained thermosensitive recording material, is preferably in the range of about 1 to 50 $\mu$m, more preferably in the range of 3 to 20 $\mu$m.

For the purpose of improving the coating properties and the recording characteristics, the coating liquid for the thermosensitive recording layer may further comprise a variety of additives which are employed in the conventional thermosensitive recording papers.

For the transparent support for use in the thermosensitive recording material according to the present invention, there can be generally employed a film made of a polyester resin such as polyethylene torephthalate or polybutylene terephthalate; a film made of a cellulose derivative such as cellulose triacetate; a film made of a polyolefin resin such as polypropylene or polyethylene; and a film of polystyrene. Further, those films may be laminated to prepare a support of the thermosensitive recording material.

As the heating means for forming images on the transparent thermosensitive recording material of the present invention, for instance, a thermal pen, a thermal head, and means for application of laser can be employed, but there are no particular limitations on the above-mentioned heating means.

Other features of this invention will become apparent in the course of the following description of exemplary embodiments, which are given for illustration of the invention and are not intended to be limiting thereof.

EXAMPLE 1

A mixture of the following components was sufficiently dispersed and pulverized in a ball mill so as to have a particle size of 0.3 $\mu$m, whereby a coating liquid A for a thermosensitive recording layer was prepared:

[Thermosensitive recording layer coating liquid A]

| | Parts by Weight |
|---|---|
| 3-diethylamino-6-methyl-7-anilinofluoras | 4 |
| Octadecylphosphonic acid | 12 |

-continued

[Thermosensitive recording layer coating liquid A]

| | Parts by Weight |
|---|---|
| Polyvinyl butyral "Denlen Butyral #3000-2" (Trademark) made by Denki Kagaku Kogyo Kabushiki kaisha) | 6 |
| Toluene | 57 |
| Methyl ethyl ketone | 57 |

The thus prepared thermosensitive recording layer coating liquid A was coated on a 75-μm-thick polyester film (Trademark "Teijin Tetoron Film HMW-75", made by Teijin Limited) serving as a support, and dried, whereby a thermosensitive recording layer with a thickness of 13 μm was formed on the support.

The following components were mixed to prepare a protective layer coating liquid B:

[Protective layer coating liquid B]

| | Parts by Weight |
|---|---|
| Urethane acrylate ultraviolet curing resin "Unidic C7-157" (Trademark) made by Dainippon Ink & Chemicals, Incorporated (Solid content: 75%) | 120 |
| Silicone-modified polyvinyl butyral (Content of silicone segment: 20 wt %, and solid content: 12.5%) | 160 |
| Methyl ethyl ketone | 600 |

The thus obtained protective layer coating liquid B was coated on the above-prepared thermosensitive recording layer, and dried and cured using an ultraviolet lamp of 80 W/cm, whereby a protective layer with a thickness of 3 μm was provided on the thermosensitive recording layer.

Thus, a thermosensitive recording material No. 1 according to the present invention was obtained.

EXAMPLE 2

The procedure for preparation of the thermosensitive recording material No. 1 in Example 1 was repeated except that the formulation for the protective layer coating liquid B used in Example 1 was changed to the following formulation for a protective layer coating liquid C:

[Protective layer coating liquid C]

| | Parts by Weight |
|---|---|
| Urethane acrylate ultraviolet curing resin "Unidic C7-157" (Trademark) made by Dainippon Ink & Chemicals, Incorporated (Solid content: 75%) | 100 |
| Silicone-modified polyvinyl butyral (Content of silicone segment: 20 wt %, and solid content: 12.5%) | 200 |

-continued

[Protective layer coating liquid C]

| | Parts by Weight |
|---|---|
| Tolylene diisocyanate compound "Coronate L" (Trademark) made by Nippon Polyurethane Industry Co., Ltd. (Solid content: 75%) | 40 |
| Methyl ethyl ketone | 560 |

Thus, a thermosensitive recording material No. 2 according to the present invention was obtained.

EXAMPLE 3

The procedure for preparation of the thermosensitive recording material No. 1 in Example 1 was repeated except that the formulation for the protective layer coating liquid B used in Example 1 was changed to the following formulation for a protective layer coating liquid D:

[Protective layer coating liquid D]

| | Parts by Weight |
|---|---|
| Urethane acrylate ultraviolet curing resin "Unidic C7-157" (Trademark) made by Dainippon Ink & Chemicals, Incorporated (Solid content: 75%) | 120 |
| Silicone-modified polyvinyl butyral (Content of silicone segment: 20 wt %, and solid content: 12.5%) | 160 |
| Kaolia "UC" (Trademark) made by ENGELHARD Corporation | 100 |
| Methyl ethyl ketone | 600 |
| Tolylene diisocyanate compound "Coronate L" (Trademark) made by Nippon Polyurethane Industry Co., Ltd. (Solid content: 75%) | 10 |

Thus, a thermosensitive recording material No. 3 according to the present invention was obtained.

EXAMPLE 4

The procedure for preparation of the thermosensitive recording material No. 1 in Example 1 was repeated except that the formulation for the protective layer coating liquid B used in Example 1 was changed to the following formulation for a protective layer coating liquid E:

[Protective layer coating liquid E]

| | Parts by Weight |
|---|---|
| Urethane acrylate ultraviolet curing resin "Unidic C7-157" (Trademark) made by Dainippon Ink & Chemicals, Incorporated (Solid content: 75%) | 100 |

-continued

| [Protective layer coating liquid E] | Parts by Weight |
|---|---|
| Silicone-modified polyvinyl butyral (Content of silicone segment: 20 wt %, and solid content: 12.5%) | 200 |
| Kaolia "UC" (Trademark) made by ENGELHARD Corporation | 100 |
| Tolylene diisocyanate compound "Coronate L" (Trademark) made by Nippon Polyurethane Industry Co., Ltd. (Solid content: 75%) | 40 |
| Methyl ethyl ketone | 560 |

Thus, a thermosensitive recording material No. 4 according to the present invention was obtained.

EXAMPLE 5

The procedure for preparation of the thermosensitive recording material No. 1 in Example 1 was repeated except that the formulation for the protective layer coating liquid B used in Example 1 was changed to the following formulation for a protective layer coating liquid F:

| [Protective layer coating liquid F] | Parts by Weight |
|---|---|
| Urethane acrylate ultraviolet curing resin "Unidic C7-157" (Trademark) made by Dainippon Ink & Chemicals, Incorporated (Solid content: 75%) | 100 |
| Silicone-modified polyvinyl butyral (Content of silicone segment: 20 wt %, and solid content: 12.5%) | 200 |
| Kaolia "UC" (Trademark) made by ENGELHARD Corporation | 100 |
| Tolylene diisocyanate compound "Coronate L" (Trademark) made by Nippon Polyurethane Industry Co., Ltd. (Solid content: 75%) | 40 |
| Zinc stearate (toluene dispersion with a solid content of 75%) | 10 |
| Methyl ethyl ketone | 560 |

Thus, a thermosensitive recording material No. 5 according to the present invention was obtained.

EXAMPLE 6

The procedure for preparation of the thermosensitive recording material No. 1 in Example 1 was repeated except that the formulation for the protective layer coating liquid B used in Example 1 was changed to the following formulation for a protective layer coating liquid G:

| [Protective layer coating liquid G] | Parts by Weight |
|---|---|
| Urethane acrylate ultraviolet curing resin "Unidic C7-157" (Trademark) made by Dainippon Ink & Chemicals, Incorporated (Solid content: 75%) | 100 |
| Silicone-modified polyvinyl butyral (Content of silicone segment: 20 wt %, and solid content: 12.5%) | 200 |
| Kaolia "UC" (Trademark) made by ENGELHARD Corporation | 100 |
| Xylylene diisocyanate compound "Takenate D110N" (Trademark) made by Takeda Chemical Industries, Ltd. (Solid content: 75%) | |
| Zinc stearate (toluene dispersion with a solid content of 75%) | 10 |
| Methyl ethyl ketone | 500 |

Thus, a thermosensitive recording material No. 6 according to the present invention was obtained.

EXAMPLE 7

The procedure for preparation of the thermosensitive recording material No. 1 in Example 1 was repeated except that the formulation for the protective layer coating liquid B used in Example 1 was changed to the following formulation for a protective layer coating liquid H:

| [Protective layer coating liquid H] | Parts by Weight |
|---|---|
| Urethane acrylate ultraviolet curing resin "Unidic C7-157" (Trademark) made by Dainippon Ink & Chemicals, Incorporated (Solid content: 75%) | 100 |
| Silicone-modified polyvinyl butyral (Content of silicone segment: 20 wt %, and solid content: 12.5%) | 200 |
| Kaolia "UC" (Trademark) made by ENGELHARD Corporation | 100 |
| Tolylene diisocyanate compound "Coronate L" (Trademark) made by Nippon Polyurethane Industry Co., Ltd. (Solid content: 75%) | 40 |
| Amino-modified silicone oil | 5 |
| Methyl ethyl ketone | 550 |

Thus, a thermosensitive recording material No. 7 according to the present invention was obtained.

EXAMPLE 8

The procedure for preparation of the thermosensitive recording material No. 1 in Example 1 was repeated except that the formulation for the protective layer coating liquid B used in Example 1 was changed to the following formulation for a protective layer coating liquid I:

[Protective layer coating liquid I]

| | Parts by Weight |
|---|---|
| Urethane acrylate ultraviolet curing resin "Unidic C7-157" (Trademark) made by Dainippon Ink & Chemicals, Incorporated (Solid content: 75%) | 10 |
| Silicone-modified polyvinyl butyral (Content of silicone segment: 20 wt %, and solid content: 12.5%) | 400 |
| Kaolia "UC" (Trademark) made by ENGELHARD Corporation | 50 |
| Tolylene diisocyanate compound "Coronate L" (Trademark) made by Nippon Polyurethane Industry Co., Ltd. (Solid content: 75%) | 40 |
| Methyl ethyl ketone | 600 |

Thus, a thermosensitive recording material No. 8 according to the present invention was obtained.

EXAMPLE 9

The procedure for preparation of the thermosensitive recording material No. 1 in Example 1 was repeated except that the formulation for the protective layer coating liquid B used in Example 1 was changed to the following formulation for a protective layer coating liquid J:

[Protective layer coating liquid J]

| | Parts by Weight |
|---|---|
| Urethane acrylate ultraviolet curing resin "Unidic C7-157" (Trademark) made by Dainippon Ink & Chemicals, Incorporated (Solid content: 75%) | 20 |
| Silicone-modified polyvinyl butyral (Content of silicone segment: 20 wt %, and solid content: 12.5%) | 10 |
| Kaolia "UC" (Trademark) made by ENGELHARD Corporation | 5 |
| Tolylene diisocyanate compound "Coronate L" (Trademark) made by Nippon Polyurethane Industry Co., Ltd. (Solid content: 75%) | 1 |
| Methyl ethyl ketone | 130 |

Thus, a thermosensitive recording material No. 9 according to the present invention was obtained.

EXAMPLE 10

The procedure for preparation of the thermosensitive recording material No. 1 in Example 1 was repeated except that the formulation for the protective layer coating liquid B used in Example 1 was changed to the following formulation for a protective layer coating liquid K:

[Protective layer coating liquid K]

| | Parts by Weight |
|---|---|
| Urethane acrylate ultraviolet curing resin "Unidic C7-157" (Trademark) made by Dainippon Ink & Chemicals, Incorporated (Solid content: 75%) | 100 |
| Silicone-modified polyvinyl butyral (Content of silicone segment: 20 wt %, and solid content: 12.5%) | 200 |
| Kaolia "UC" (Trademark) made by ENGELHARD Corporation | 100 |
| Xylene diisocyante compound "Takenate D110N" (Trademark made by Takeda Chemical Industries, Ltd. (Solid content: 75%) | 40 |
| Zinc stearate (toluene dispersion with solid content of 75%) | 10 |
| Methyl ethyl ketone | 500 |
| Decolorization agent A (available from Asahi Denka Kogyo K.K.) | 1 |

Thus, a thermosensitive recording material No. 10 according to the present invention was obtained.

COMPARATIVE EXAMPLE 1

The procedure for preparation of the thermosensitive recording material No. 1 in Example 1 was repeated except that the formulation for the protective layer coating liquid B used in Example 1 was changed to the following formulation for a protective layer coating liquid L:

[Protective layer coating liquid L]

| | Parts by Weight |
|---|---|
| Urethane acrylate ultraviolet curing resin "Unidic C7-157" (Trademark) made by Dainippon Ink & Chemicals, Incorporated (Solid content: 75%) | 133 |
| Polyether-modified silicone oil | 3 |
| Kaolia "UC" (Trademark) made by ENGELHARD Corporation | 100 |
| Methyl ethyl ketone | 264 |

Thus, a comparative thermosensitive recording material No. 1 was obtained.

COMPARATIVE EXAMPLE 2

The procedure for preparation of the thermosensitive recording material No. 1 in Example 1 was repeated except that the formulation for the protective layer coating liquid B used in Example 1 was changed to the following formulation for a protective layer coating liquid M:

[Protective layer coating liquid M]

| | Parts by Weight |
|---|---|
| Silicone-modified polyvinyl butyral (Content of silicone segment: 20 wt %, and solid content: 12.5%) | 800 |
| Kaolia "UC" (Trademark) made by ENGELHARD Corporation | 100 |
| Methyl ethyl ketone | 1600 |

Thus, a comparative thermosensitive recording material No. 2 was obtained.

Each of the transparent thermosenuitive recording materials No. 1 to No. 10 according to the present invention and comparative transparent thermosensitive recording materials No. 1 and No. 2 was subjected to the following evaluation tests:

(1) Adhesion of thermofusible dust to thermal head

Each thermosensitive recording material was subjected to thermal printing using a thermal printer made by Okura Denki Co., Ltd., to produce a solid image of three meters in length under the following conditions:

Dot density of a thermal head: 8 dots/mm.

Platen pressure: 6 kg/A4 size.

Applied electric power: 29.9 mJ/mm$^2$ and 38.4 mJ/mm$^2$ respectively for a pulse width of 0.7 ms and 0.9 ms.

Line period: 10 ms/line.

After the completion of thermal printing, the amount of thermofusible material adhering to the following two points A and B of the thermal head of the thermal printer was observed using an optical microscope:

Point A: a surface portion of a heating element of the thermal head which was in contact with the thermosensitive recording material in the course of thermal printing.

Point B: a portion of the thermal head, downstream with respect to the heating element along the transporting direction of the thermosenuitive recording material.

Thus, the amount of dust of thermofusible material was evaluated on a scale from 1 to 5 in reference to the reference samples.

[Adhesion of thermofusible dust to the point A of thermal head]

5: There was no dust of thermofusible material.
4: There was slight amount of thermofusible material dust.
3: The thermofusible material dust was noticeable, but it had no effect on thermal printing.
2: The thermofusible material dust was very noticeable, and consequently, the obtained image became somewhat blurred.
1: The thermofusible material dust was significant, and consequently, the image blurring was striking.

[Adhesion of thermofusible dust to the point B of thermal head]

5: There was no dust of thermofusible material.
4: The thermofusible material dust was slight.
3: The thermofusible material dust was noticeable.
2: The thermofusible material dust was very noticeable.
1: The thermofusible material dust was significant.

(2) Sticking to thermal head

It was evaluated on a scale from 1 to 5 from the visual inspection of the solid image sample obtained in each thermosensitive recording material whether the sticking phenomenon took place, or not.

5: There occurred no sticking phenomenon.
4: The sticking phenomenon was slightly observed.
3: The sticking phenomenon was noticeable.
2: The sticking phenomenon was very noticeable.
1: The sticking phenomenon was significant.

(3) Density of background

The background density of each image sample was measured using a transmission type densitometer "X-Rite 309" (Trademark), made by XRITE Company, Ltd., at the UV position.

The results of the above-mentioned evaluations are shown in Table 1.

TABLE 1

| | Thermal Printing at Pulse Width of 9.7 ms | | | Thermal Printing at Pulse Width of 0.9 ms | | | |
|---|---|---|---|---|---|---|---|
| Example No. | Adhesion of thermo-fusible material dust to point A | Adhesion of thermo-fusible material dust to point B | Sticking phenomenon | Adhesion of thermo-fusible material dust to point A | Adhesion of thermo-fusible material dust to point B | Sticking phenomenon | Background Density |
| Ex. 1 | 4 | 4 | 4 | 3 | 3 | 3 | 0.19 |
| Ex. 2 | 4 | 4 | 5 | 4 | 4 | 4 | 0.25 |
| Ex. 3 | 5 | 5 | 5 | 4 | 5 | 4 | 0.26 |
| Ex. 4 | 5 | 5 | 5 | 4 | 5 | 5 | 0.25 |
| Ex. 5 | 5 | 5 | 5 | 5 | 5 | 5 | 0.25 |
| Ex. 6 | 5 | 5 | 5 | 5 | 5 | 5 | 0.18 |
| Ex. 7 | 5 | 5 | 5 | 5 | 5 | 5 | 0.24 |
| Ex. 8 | 5 | 4 | 4 | 4 | 3 | 3 | 0.26 |
| Ex. 9 | 4 | 5 | 4 | 3 | 4 | 3 | 0.25 |
| Ex. 10 | 5 | 5 | 5 | 5 | 5 | 5 | 0.16 |
| Comp. Ex. 1 | 3 | 3 | 1 | 2 | 1 | 0.18 | |
| Comp. Ex. 2 | 5 | 3 | 5 | 3 | 2 | 3 | 0.18 |

As can be seen from the results shown in Table 1, the adhesion of thermofusible material dust to the thermal head can be minimized and the occurrence of sticking phenomenon can be prevented during the thermal printing operation when the thermosensitive recording materiales according to the present invention are employed.

Japanese Patent Application No. 07-349036 filed Dec. 21, 1995 and Japanese Patent Application No. 07-351330 filed Dec. 27, 1995 are hereby incorporated by reference.

What is claimed is:

1. A thermosensitive recording material, comprising:

a support;

a thermosensitive recording layer formed thereon comprising an electron-donating coloring compound, an electro-accepting compound and a binder resin, and a protective layer formed on said thermosensitive recording layer comprising an ultraviolet-curing resin and a copolymer resin comprising a silicone component as a copolymerizing component therefor, wherein the silicone component of the copolymer resin is a member selected from the group consisting of silicone-modified polyvinyl butyral, silicone-modified polyvinyl acetal, silicone-modified polyacrylate, silicone-modified polymethacrylate, silicone-modified polyvinyl acetoacetal, silicone-modified cellulose acetate propionate, silicone-modified cellulose acetate, silicone-modified cellulose acetate butyrate, silicone-modified ethylcellulose, silicone-modified polyurethane and silicone-modified polyester.

2. The thermosensitive recording material as claimed in claim 1, wherein said protective layer further comprises a cross-linking agent which reacts with said copolymer resin comprising said silicone component.

3. The thermosensitive recording material as claimed in claim 2, wherein said cross-linking agent comprises an isocyanate compound.

4. The thermosenmitive recording material as claimed in claim 3, wherein said isocyanate compound is xylylene diisocyanate.

5. The thermosensitive recording material as claimed in claim 2, wherein said cross-linking agent is a member selected from the group consisting of xylylene diisocyanate, tolylene diisocyanate, 4,4-diphenylmethane diisocyanate, 1,5-naphthalene diisocyanate, triphenylmethane triisocyanate, tolidine diisocyanate, xylene diisocyanate, hexamethylene diisocyanate and modified compounds thereof, dicyclohexylmethane diisocyanate and isophorone diisocyanate.

6. The thermosensitive recording material as claimed in claim 1, wherein said copolymer resin comprising said silicone component is a silicone graft copolymer or a silicone block copolymer.

7. The thermosensitive recording material as claimed in claim 1, wherein said copolymer resin comprising said silicone component is selected from the group consisting of a silicone-modified polyvinyl butyral and a silicone-modified polyvinyl acetal.

8. The thermosensitive recording material as claimed in claim 1, wherein said protective layer further comprises at least one component selected from the group consisting of a metallic soap and an amino-modified silicone oil.

9. The thermosensitive recording material as claimed in claim 1, wherein said thermosensitive recording layer or said protective layer further comprises at least one decolorization agent selected from the group consisting of compounds A to D:

a compound A with formula of:

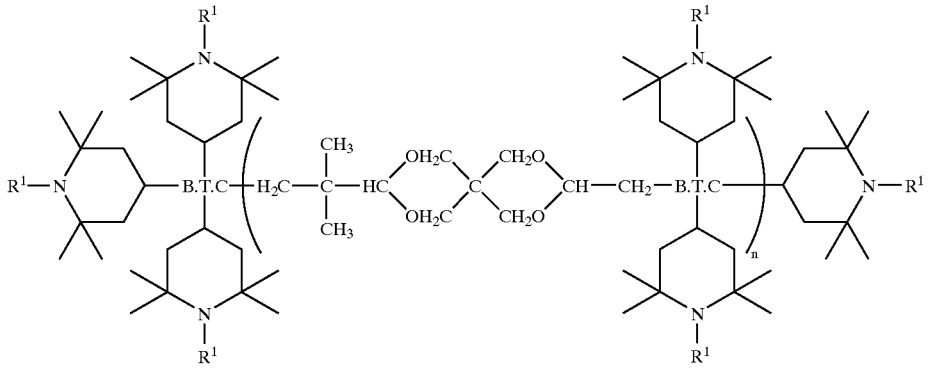

wherein n is an integer, $R^1$ is $CH_3$;

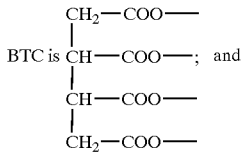

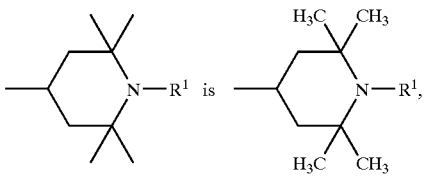

a compound B with formula of:

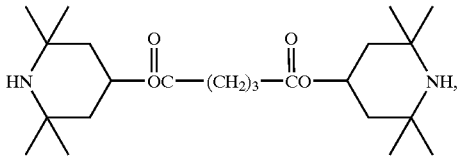

a compound C with formula of:

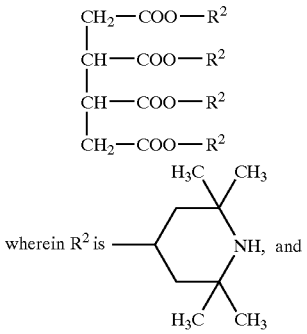

a compound D of 1,3-dicyclohexyl-2-(2',5'-dicyclophenyl)guanidine.

10. The thermosensitive recording material as claimed in claim 1, wherein said protective layer further comprises a filler.

11. The thermosensitive recording material as claimed in claim 1, wherein said ultraviolet-curing resin is contained in an amount of 10 to 50 wt. % of the total weight of the entire solid components of said protective layer.

12. The thermosensitive recording material as claimed in claim 1, wherein the weight ratio of said copolymer resin comprising said silicone component to said ultraviolet-curing resin is in the range of 1:9 to 7:3.

13. The thermosensitive recording material as claimed in claim 1, wherein said copolymer resin comprising a silicone component is silicone-modified polyvinyl butyral of silicone-modified polyvinyl acetal.

*14. The thermosensitive recording material as claimed in claim 1, wherein the thickness of the protective layer is in the range of 0.3–10 μm.*

*15. The thermosensitive recording material as claimed in claim 14, wherein the filler is a finely divided inorganic filler of calcium carbonate, silica, zinc oxide, titanium oxide, aluminum hydroxide, zinc hydroxide, barium sulfate, kaolin, talc or surface treated calcium carbonate and silica or a finely divided organic filler or urea-formalin resin, styrene-methacrylic copolymer or polystyrene resin.*

*16. The thermosensitive recording material as claimed in claim 2, wherein the protective layer further comprises a filler having an average particle size of 3 μm or less and an oil absorption of at least 10 ml.*

*17. The thermosensitive recording material as claimed in claim 16, wherein the weight ratio of filler to resin component comprising the ultraviolet-curing resin and the copolymer resin to the cross-linking agent is (10–60%):(5–75%):(3–30%).*

* * * * *